United States Patent [19]

Tamada et al.

[11] Patent Number: 4,757,543
[45] Date of Patent: Jul. 12, 1988

[54] ENCRYPTING AND DECRYPTING DEVICE WHICH STORES AN ALGORITHM IN A MEMORY

[75] Inventors: Masuo Tamada, Yokohama; Hitoshi Kokuryo, Sagamihara; Shinsuke Tamura; Hiroshi Ozaki, both of Yokohama, all of Japan

[73] Assignee: Kabushiki Kaisha Toshiba, Kawasaki, Japan

[21] Appl. No.: 902,884

[22] Filed: Sep. 2, 1986

Related U.S. Application Data

[62] Division of Ser. No. 698,876, Feb. 6, 1985, abandoned.

[30] Foreign Application Priority Data

Feb. 9, 1984 [JP] Japan ................................ 59-22171
Feb. 9, 1984 [JP] Japan ................................ 59-22172
Feb. 9, 1984 [JP] Japan ................................ 59-22173

[51] Int. Cl.⁴ .................... H04L 9/00; G06F 1/00; G06K 5/00
[52] U.S. Cl. .................... 380/51; 380/24; 380/28; 380/55; 364/900; 235/380
[58] Field of Search ... 364/200 MS File, 900 MS File; 235/379, 380, 381, 382.5; 380/24, 28, 55, 51; 283/17, 55

[56] References Cited

U.S. PATENT DOCUMENTS

| 4,268,715 | 5/1981 | Atalla ........................ 235/379 |
| 4,277,837 | 7/1981 | Stuckert ..................... 364/900 |
| 4,355,369 | 10/1982 | Garuin ...................... 364/900 |
| 4,511,970 | 4/1985 | Okano et al. ............... 364/900 |
| 4,578,530 | 3/1986 | Zeidler ........................ 380/24 |
| 4,675,669 | 6/1987 | Goldman ..................... 235/487 |

FOREIGN PATENT DOCUMENTS

| 0114368 | 8/1984 | European Pat. Off. ...... 235/379 |
| 0167045 | 8/1985 | Japan ........................... 235/379 |
| 0167047 | 8/1985 | Japan ........................... 235/379 |

Primary Examiner—Gareth D. Shaw
Assistant Examiner—Rebecca L. Adams
Attorney, Agent, or Firm—Cushman, Darby & Cushman

[57] ABSTRACT

A data processing terminal device is on-line connected to a host computer and records on journal paper journal data obtained as a result of communication with the host computer. Data is encrypted, and encrypted data is exchanged between the terminal device and the host computer. The encrypted journal data is printed together with the normal journal data on the journal paper. The algorithm used to encrypt the data is stored on an ic card issued to the user and updated periodically. By comparing the journal data with its encrypted data, journal data alteration can be easily detected.

8 Claims, 11 Drawing Sheets

F I G. 8
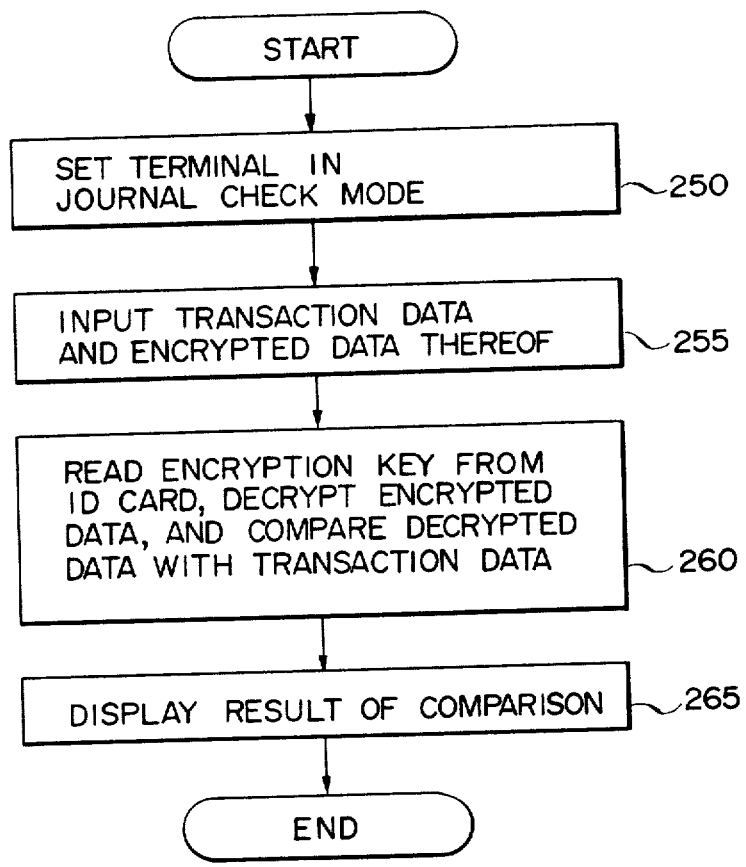

ENCRYPTING AND DECRYPTING DEVICE WHICH STORES AN ALGORITHM IN A MEMORY

This is a division of application Ser. No. 698,876, filed Feb. 6, 1985 now abandoned.

BACKGROUND OF THE INVENTION

The present invention relates to a data processing terminal device (e.g., an automatic teller machine in a bank) which is on-line connected to a host computer and records a journal (result) of communication with the host computer.

Conventional banking terminals such as ATMs (automatic teller machines) are usually installed only in bank branches. However, in keeping with the versatility of recent communication networks, these banking terminals are now being installed in general companies and private homes and are on-line connected with the host computer through a communication network, thereby providing a variety of service applications. In a system having data processing terminal devices installed in locations where banks cannot directly provide maintenance, the following drawback occurs:

In general, the journal representing the transactions is recorded in both the host computer and the terminal device. This recording is performed so that all transactions are printed on journal paper or stored in a floppy disk. The journal recorded in the terminal device is not under the control of the bank and can be altered by a user. For example, a user may bring a journal slip with altered transaction data to a bank and claim he did not perform a particular transaction. This situation can arise because the journal is recorded in a rewritable recording medium. A recording medium which cannot be subjected to rewriting at a terminal device is exemplified only by a PROM. In the foregoing circumstance, a PROM having a large memory capacity would be required to store all journal data. Such a PROM cannot be used for this purpose due to high cost.

SUMMARY OF THE INVENTION

It is an object of the present invention to prevent journal alteration at a data processing terminal device which is on-line connected to a host computer and which records a journal of communication with the host computer.

In order to achieve the above object of the present invention, there is provided a data processing terminal device and method for operating same having means for performing processing of journal data which is unknown to a user of the data processing terminal in order to convert the journal data to modified journal data, the journal data and/or the modified journal data being recorded in the data processing terminal device.

BRIEF DESCRIPTION OF THE DRAWINGS

FIG. 8 is a flow chart for explaining journal data alteration detection in the terminal device of FIG. 5;

DETAILED DESCRIPTION OF THE PREFERRED EMBODIMENTS

Figure 1:
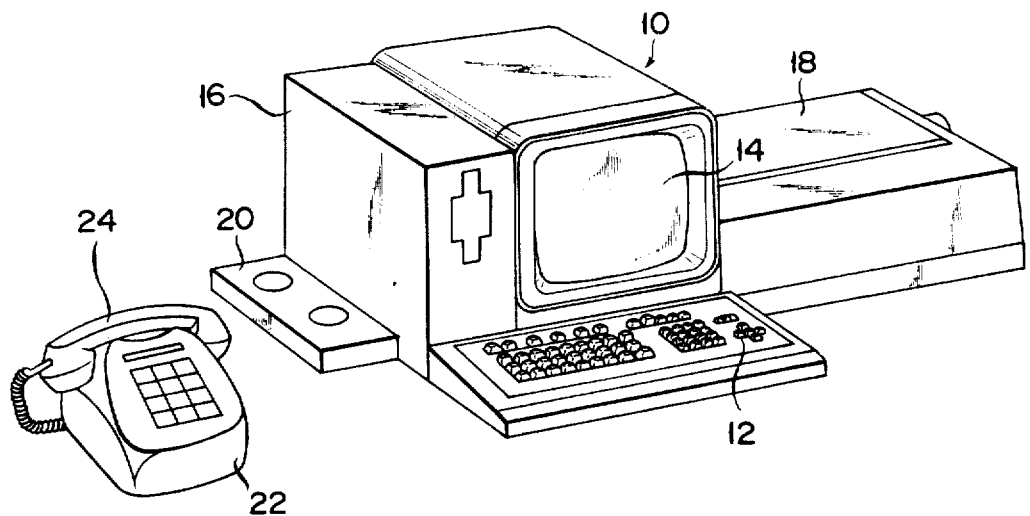
FIG. 1 is a perspective view of a data processing terminal device according to a first embodiment of the present invention.
Figure 2:
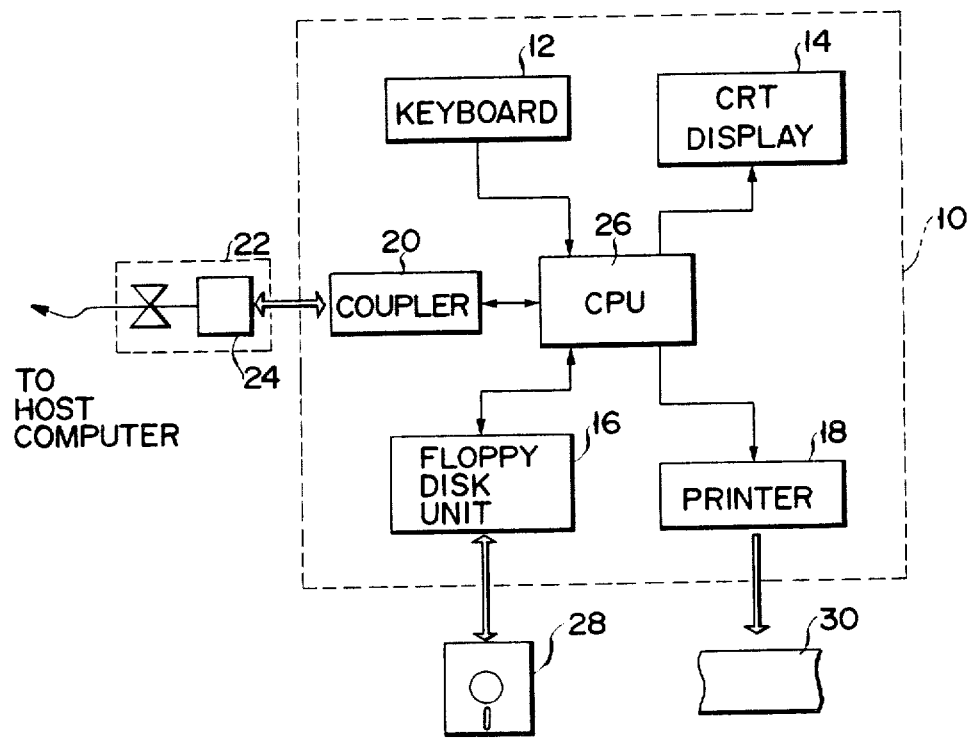
FIG. 2 is a block diagram of the terminal device shown in FIG. 1.

Data processing terminal devices according to the preferred embodiments will be described with reference to the accompanying drawings. FIG. 1 is a perspective view of a data processing terminal device according to a first embodiment of the present invention, and FIG. 2 is a block diagram thereof. A terminal device 10 has the same outer appearance as a general personal computer. The terminal device 10 comprises a keyboard 12, a CRT display 14, a floppy disk unit 16, a printer 18, a coupler 20 and a CPU 26 connected to the above components so as to control them. The terminal device 10 is to be installed as an ATM of a bank in a company or private home, but not in a bank branch. The user enters a password and a transaction amount at the keyboard 12. The CRT display 14 displays instruction prompts for causing the user to perform proper operations, and a journal check result to be described later. The floppy disk unit 16 reads out a control program for the CPU 26 from a floppy disk 28 and temporarily stores communication data in the floppy disk 28 when the terminal device 10 communicates with the host computer. The printer 18 prints journal data of transactions on journal paper 30. The coupler 20 is coupled to a handset 24 of a telephone set 22 to convert an electrical signal to an acoustic signal and vice versa so as to on-line connect the CPU 26 to a host computer (not shown).

Figure 3:
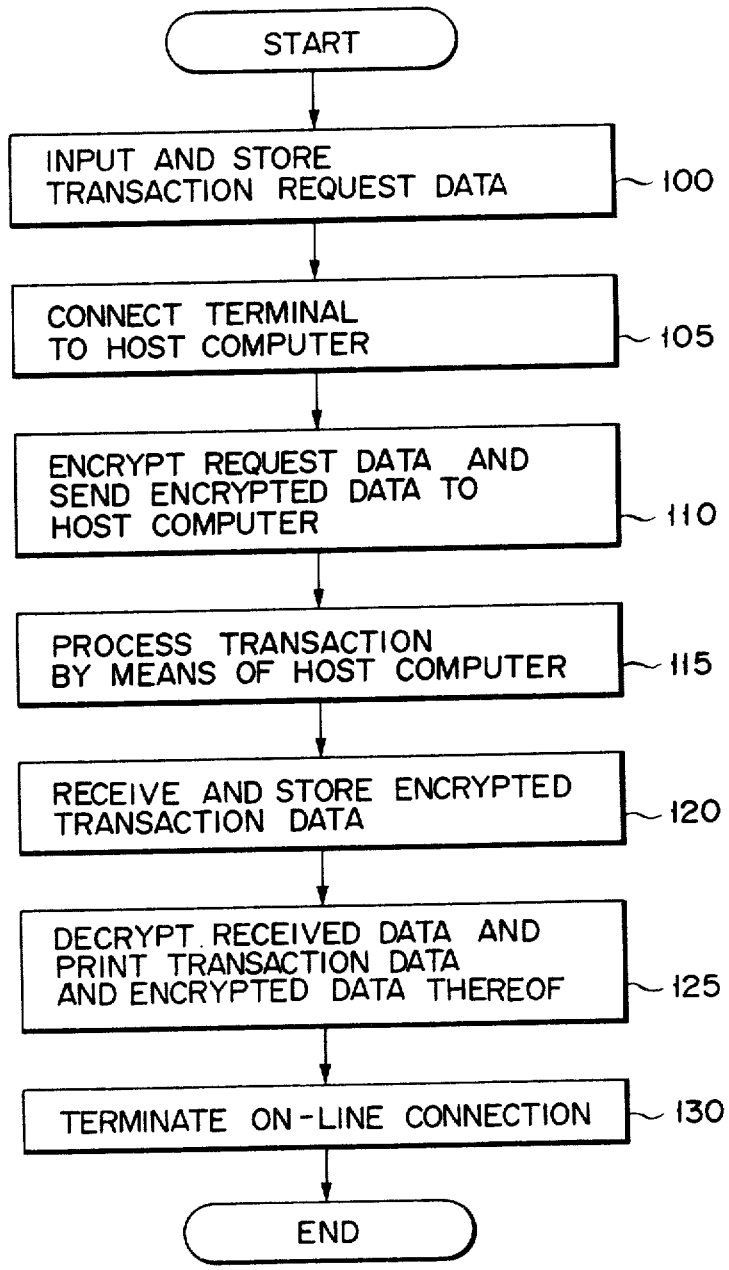
FIG. 3 is a flow chart for explaining the operation of the terminal device shown in FIG. 1.

The operation of the data processing terminal device according to the first embodiment will be described with reference to a flow chart of FIG. 3. A case will be exemplified wherein a user performs a transfer transaction from his own account to another account and journal data comprises transaction data sent from the host computer which represents the outstanding balance of the user's account after the transfer transaction is completed. When the user depresses a transfer transaction request key at the keyboard 12, the CRT display 14 displays a prompt for transfer transaction request data. The user then enters transaction request data such as a password, a transferee account number, a transfer amount and the like at the keyboard 12. The CPU 26 stores the input transaction request data in the floppy disk 28 (step 100). The CRT display 14 displays a prompt for on-line connection with the host computer in the bank. The user dials the telephone number for the host computer using the telephone set 22 in accordance with this prompt. When the user checks that the connection is made, he couples the handset 24 to the coupler 20, thereby on-line connecting the terminal device 10 to the host computer (step 105). The CPU 26 reads out the transaction request data from the floppy disk 28 in step 110. The readout data is encrypted, and the encrypted data is sent to the host computer. In step 115, the host computer decrypts the encrypted transaction request data and checks the transaction conditions such as the outstanding balance of the transferer's account. When the transaction conditions satisfy the transaction request data, the outstanding balances of the transferer's and transferee's accounts are adjusted, i.e., updating of the corresponding general ledger is performed. The host computer creates transaction data representing the updated ledger data. The transaction data is encrypted and sent to the terminal device. In step 120, the CPU 26 stores the received encrypted transaction data in the floppy disk 28. In step 125, the CPU 26 reads out the encrypted transaction data from the floppy disk 28 and causes the printer 18 to print the encrypted data and the decrypted transaction data on the journal paper 30. When the user checks an end of communication with the host computer, he removes the handset 24 from the coupler 20 to terminate the on-line connection, as shown in step 130.

Figure 4:
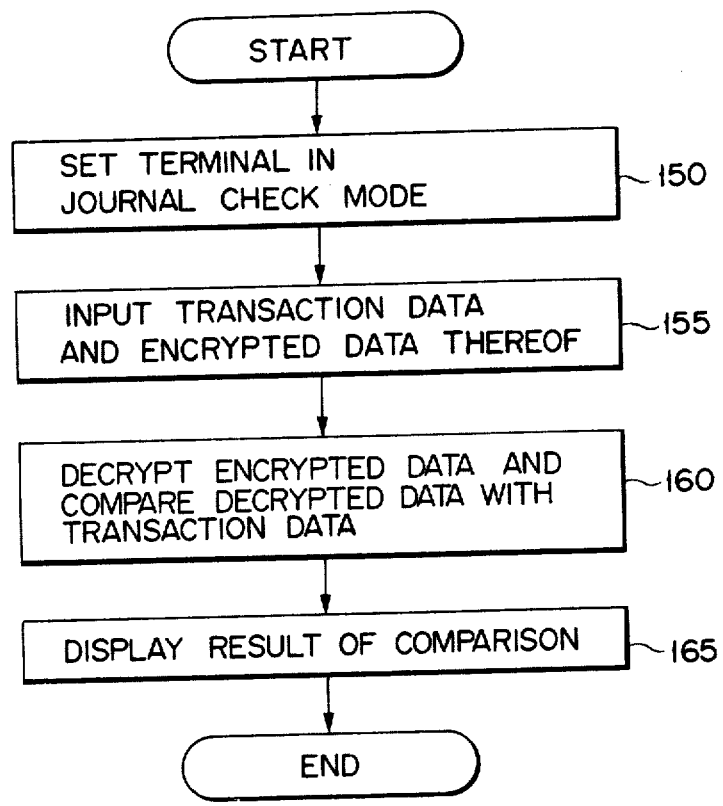
FIG. 4 is a flow chart for explaining journal data alteration detection in the terminal device of FIG. 1.

According to the first embodiment, the transaction data (journal data) representing the result of the transaction performed by the banking terminal installed in the company or private home is printed together with the corresponding encrypted data on the journal paper 30. In this case, since the encryption algorithm is unknown to the user, alteration of the transaction data in correspondence with its encrypted data cannot be performed excluding an accidental correspondence. According to the first embodiment, journal data alteration can be detected by the terminal device in the following journal check mode:

The journal check mode will be described with reference to a flow chart of FIG. 4. In step 150, the terminal device is set in the journal check mode. In step 155, the transaction data and corresponding encrypted data which are printed on the journal paper 30 are entered from the keyboard 12. In step 160, the CPU 26 decrypts the encrypted transaction data in step 160 by using the same algorithm as in step 125 and compares the input transaction data and the decrypted data. If these data do not coincide with each other, the transaction data and/or its encrypted data which are printed on the journal paper 30 are altered. Coincidence between the transaction data and its encrypted data indicates that no alteration has been performed excluding the case of accidental alteration coincidence. In step 165, the result of the comparison is displayed on the CRT display 14 to indicate whether the journal data has been altered.

As described above, according to the first embodiment, since the journal data and its encrypted data are printed on the journal paper, journal data alteration can be detected by comparing these data.

In the first embodiment, the journal data and its encrypted data are printed on the journal paper but they can be stored in the floppy disk 28. When the transaction request data is recorded as journal data, it is recorded when it is sent from the terminal device to the host computer. Further, both transaction request data and transaction data may be recorded as journal data.

The transaction is not limited to a transfer transaction, but can be extended to a deposit or withdrawal transaction.

A second embodiment of the present invention will be described hereinafter. In the first embodiment, the user at the terminal device can perform a transaction when he enters his own account number and the corresponding password. According to this key input operation, however, the user cannot be checked as having the corresponding account. In other words, a third party can use this account. In the second and subsequent embodiments, an ID card which records an account number is issued to an account owner to check whether the rightful user is using the account. No transaction can be performed without using the ID card. The ID card comprises a magnetic card or an IC card.

Figure 5:
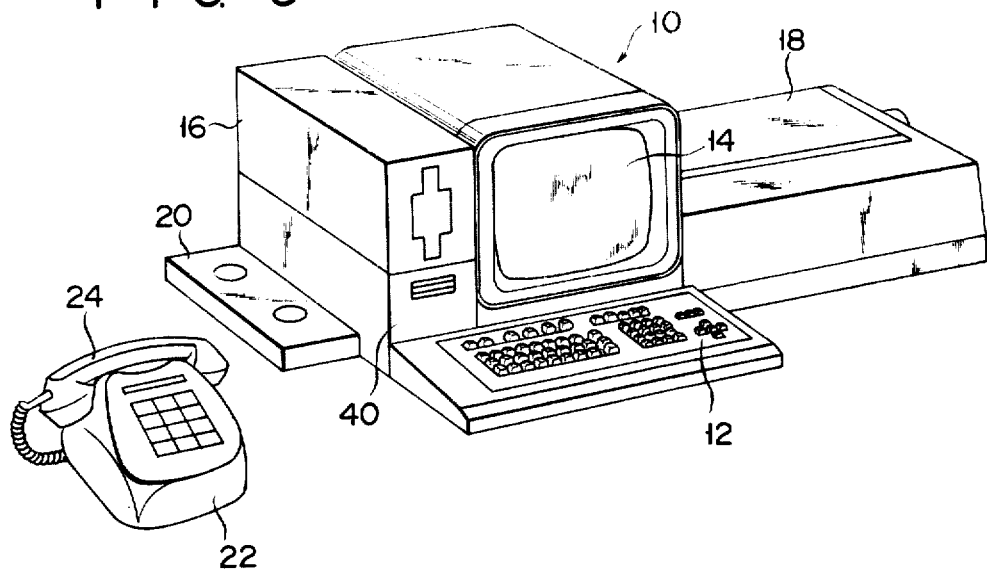
FIG. 5 is a perspective view of a data processing terminal device according to a second embodiment of the present invention.
Figure 6:
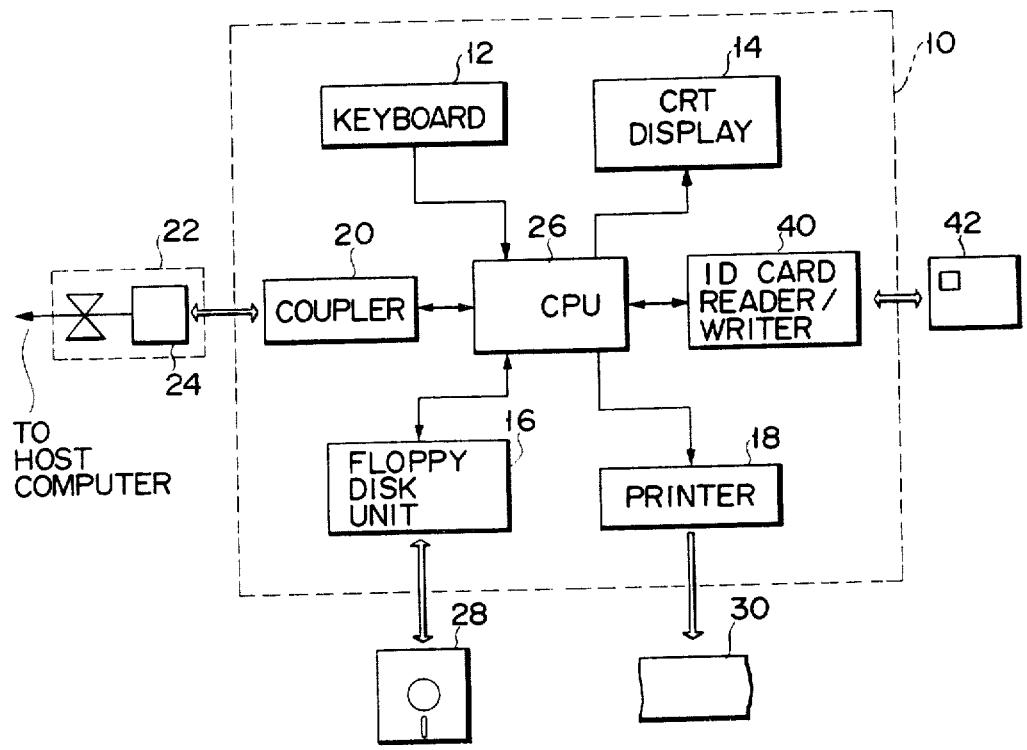
FIG. 6 is a block diagram of the terminal device shown in FIG. 5.

FIG. 5 is a perspective view of a data processing terminal device according to the second embodiment, and FIG. 6 is a block diagram thereof. The second embodiment is substantially the same as the first embodiment, except that an ID card reader/writer 40 is included under a floppy disk 16. A card insertion port is formed on the front surface of the ID card reader/writer 40 to receive the ID card 42. Other arrangements of the second embodiment are the same as those of the first embodiment. According to the second embodiment, the ID card 42 is an IC card which has a CPU, a RAM, a ROM and a PROM as a recording medium not subject to data rewriting.

Figure 7:
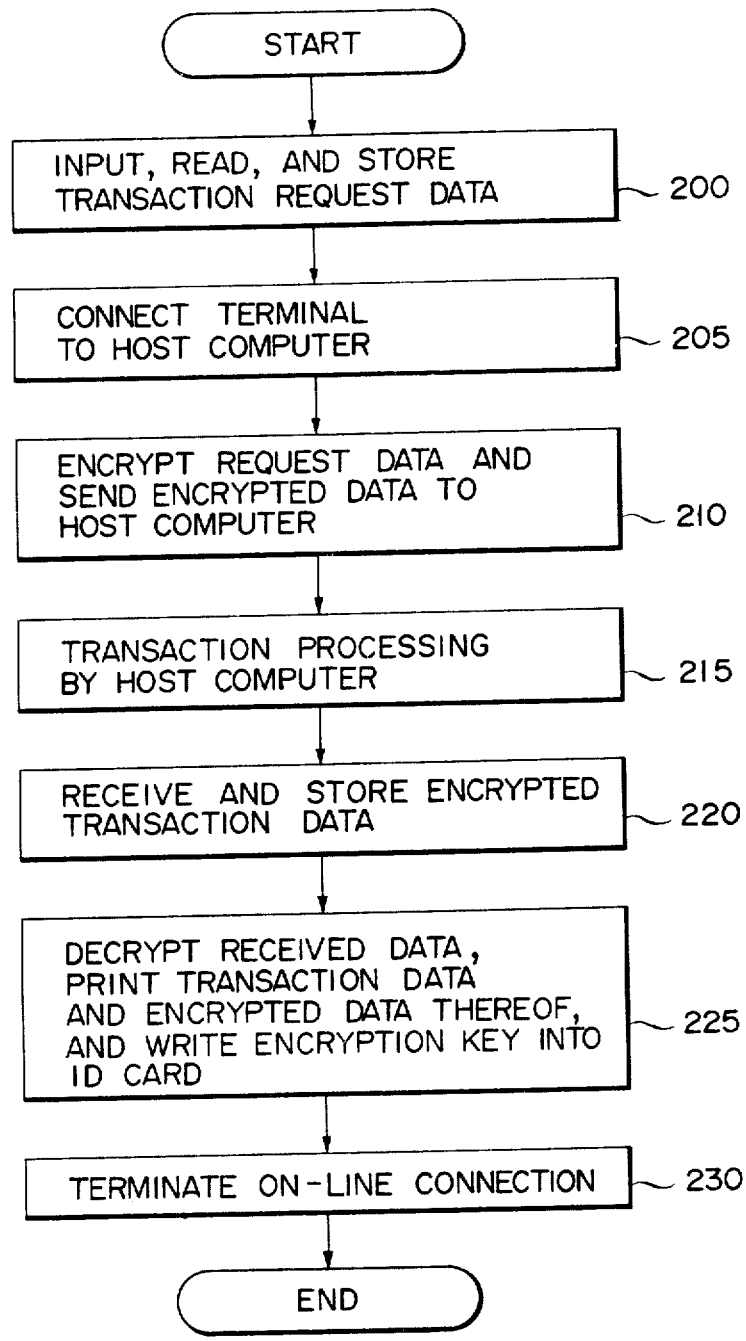
FIG. 7 is a flow chart for explaining the operation of the terminal device shown in FIG. 5.

A transaction operation of the second embodiment will be described with reference to a flow chart of FIG. 7. When the user requests a transaction, a prompt is displayed on a CRT display 14 to cause the user to insert his ID card 42 in the ID card reader/writer 40. The user inserts the ID card 42 in the ID card reader/writer 40 through its insertion port. A CPU 26 reads out an account number from the ROM of the ID card 42 and stores the readout data in a floppy disk 28. The CPU 26 causes the CRT display 14 to display prompts requesting transferee's account number and transfer amount data inputs. The user enters the transferee's account number and the transfer amount at a keyboard 12. The CPU 26 enters the input transferee's account number and transfer amount in the floppy disk 28 (step 200). The only difference between steps 100 and 200 is that the account number is entered at the keyboard 12 in step 100, but read out from the ID card 42 in step 200. However, since the ID card 42 is in the possession of the rightful owner, data access safety is improved when the data is read out from the ID card 42. The operations in steps 205 to 220 are the same as those in steps 105 to 120 wherein the host computer performs transaction operations in accordance with the transaction request data and the encrypted transaction data is sent back to the terminal device and is stored in the floppy disk 28. In the first embodiment, the encryption key is predetermined. However, when the number of journal data is increased, the encryption key might be deduced in accordance with a combination of the transaction data and its encrypted data. In order to prevent this, the encryption key is changed at every transaction or at appropriate intervals in the second embodiment. In step 225, in the same manner as in step 125, the encrypted transaction data is read out from the floppy disk 28, and the readout encrypted transaction data is printed by the printer 18 together with the decrypted transaction data thereof on journal paper 30. The encryption key of the encrypted data read out from the floppy disk 28 is written in the PROM of the IC card 42 in correspondence with the encrypted transaction data. Thereafter, the on-line connection is terminated in step 230.

According to the second embodiment, the transaction data and its encrypted data are printed on the journal paper 30 in the same manner as in the first embodiment. In addition, the encryption key changes at every transaction or after appropriate intervals to disable interpretation of the encryption key. As a result, journal data alteration is more difficult.

The journal check mode according to the second embodiment will be described in a flow chart of FIG. 8. The check mode is substantially the same as that of the first embodiment, except that, in step 260, the ID card 42 is inserted in the ID card reader/writer 40 before the encrypted transaction data is decrypted to read out the encryption key corresponding to the encrypted data from the ID card 42, and decryption is performed in accordance with the encryption key.

In the second embodiment, the encryption key is written in the ID card 42. However, another arrangement can be utilized since it is only essential to write the encryption key in the PROM. For example, the PROM may be arranged in the terminal device, and the encryption key can be written in this PROM or the PROM may be arranged in a portable device other than the ID card. In the second embodiment, data encryption and decryption are performed in the terminal device. However, these operations can be performed in the IC card. The modification made in the first embodiment can also be applied to the second embodiment.

According to the first and second embodiments, the journal data and its encrypted data are recorded in one-to-one correspondence, since these data cannot both be altered in the same manner, though they can be respectively altered. Therefore, journal alteration can be detected when these data are compared. It is not important if the encrypted journal data is not recorded together with the journal data, but it is important to record modified data provided by an unknown manner to the user. For this reason, the following embodiment will be described wherein the data recorded together with the journal data is not the encrypted data but the modified journal data obtained by processing the journal data in accordance with a technique unknown to the user. In this sense, the encrypted data is a kind of modified data. The perspective view and the block diagram of the third embodiment are the same as those of the second embodiment shown in FIGS. 5 and 6.

Figure 9:
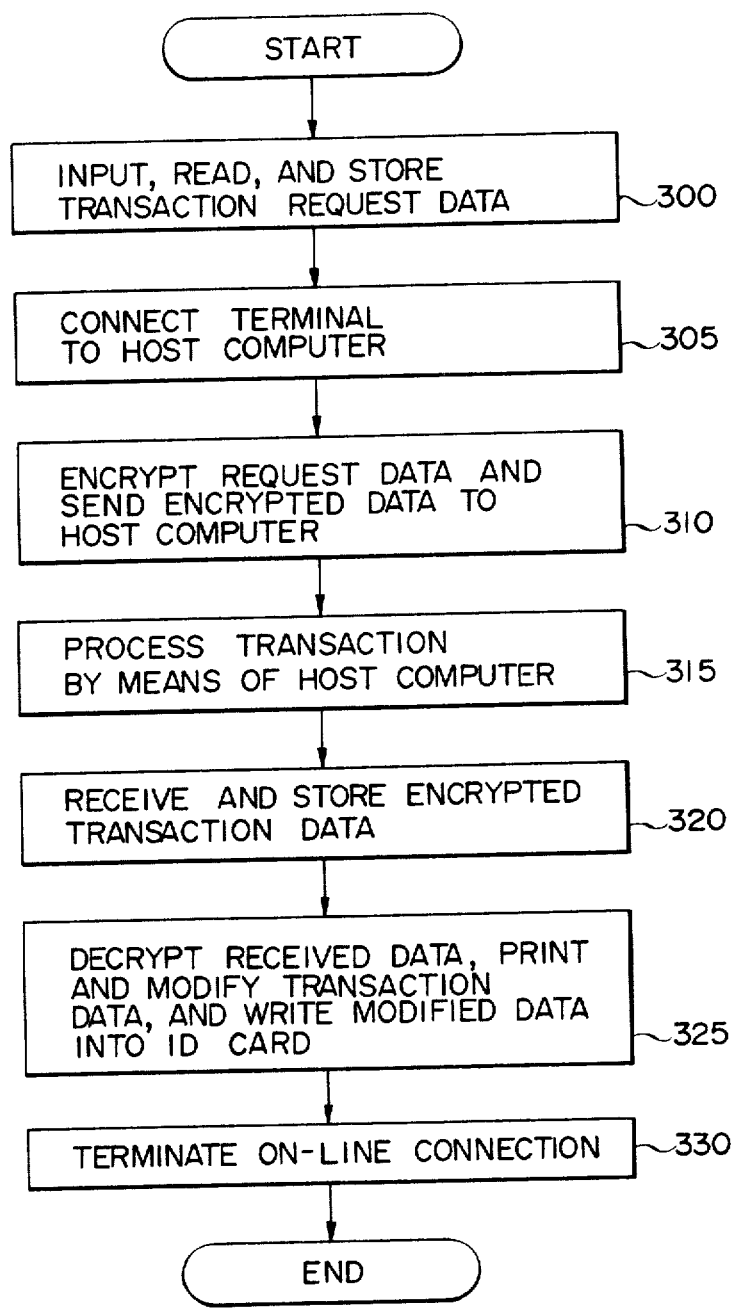
FIG. 9 is a flow chart for explaining data processing in a third embodiment of the present invention.

FIG. 9 is a flow chart of data processing according to the third embodiment. Steps 300 to 320 in FIG. 9 are the same as steps 200 to 220 of the second embodiment, respectively. In step 325, the CPU 26 reads out the encrypted transaction data from the floppy disk 28 and decrypts the transaction data. The decrypted transaction data is printed on the journal paper 30. At the same time, the CPU 26 modifies the transaction data in accordance with a predetermined processing scheme. This processing scheme is an exclusive OR calculation of all bits of the transaction data, extraction of a predetermined bit of the respective data such as outstanding balance data, or four arithmetic operations of the extracted bit. The CPU 26 writes the modified transaction data in the PROM in the ID card 42. Thereafter, the on-line connection is terminated in step 330. Since the modified data is written in the IC card, it is absolutely unalterable. However, since the modification scheme of the modified data is unknown to the user, the modified data can be printed on the journal paper 30 in the same manner as in the first and second embodiments.

Figure 10:
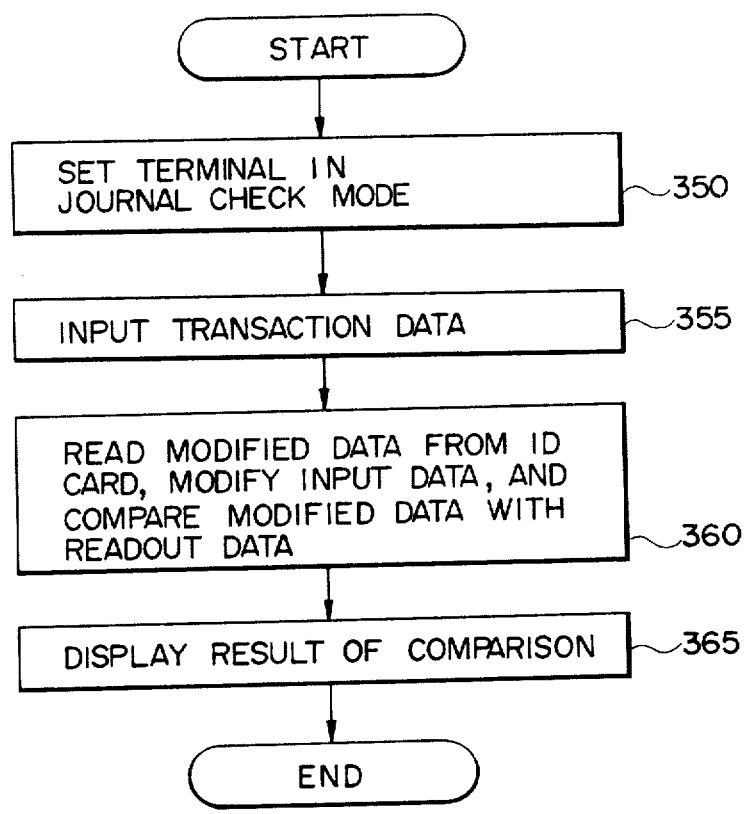
FIG. 10 is a flow chart for explaining journal data alteration detection according to the third embodiment.

Journal data alteration detection according to the third embodiment will be described with reference to a flow chart of FIG. 10. In step 350, the terminal device is set in the journal check mode. The transaction data printed on the journal paper 30 is entered at the keyboard in step 355. In step 360, the CPU 26 reads out the modified transaction data from the ID card 42 inserted in the ID card reader/writer 40. The CPU 26 then converts the input transaction data to the modified transaction data in the same processing as in step 325 and compares these two data. When they do not coincide with each other, the transaction data is altered. However, when they do coincide with each other, the transaction data is not altered. A comparison result is displayed on the CRT display 14 in step 365 to determine whether or not the journal data is altered.

According to the third embodiment, since the reference modified transaction data is written in the IC card and cannot be altered, a noncoincidence between the data in the IC card and the data written on the journal paper 30 represents an alteration of the transaction data written on the journal paper 30. The modification made in the first embodiment can also be applied to the third embodiment.

Figure 11:
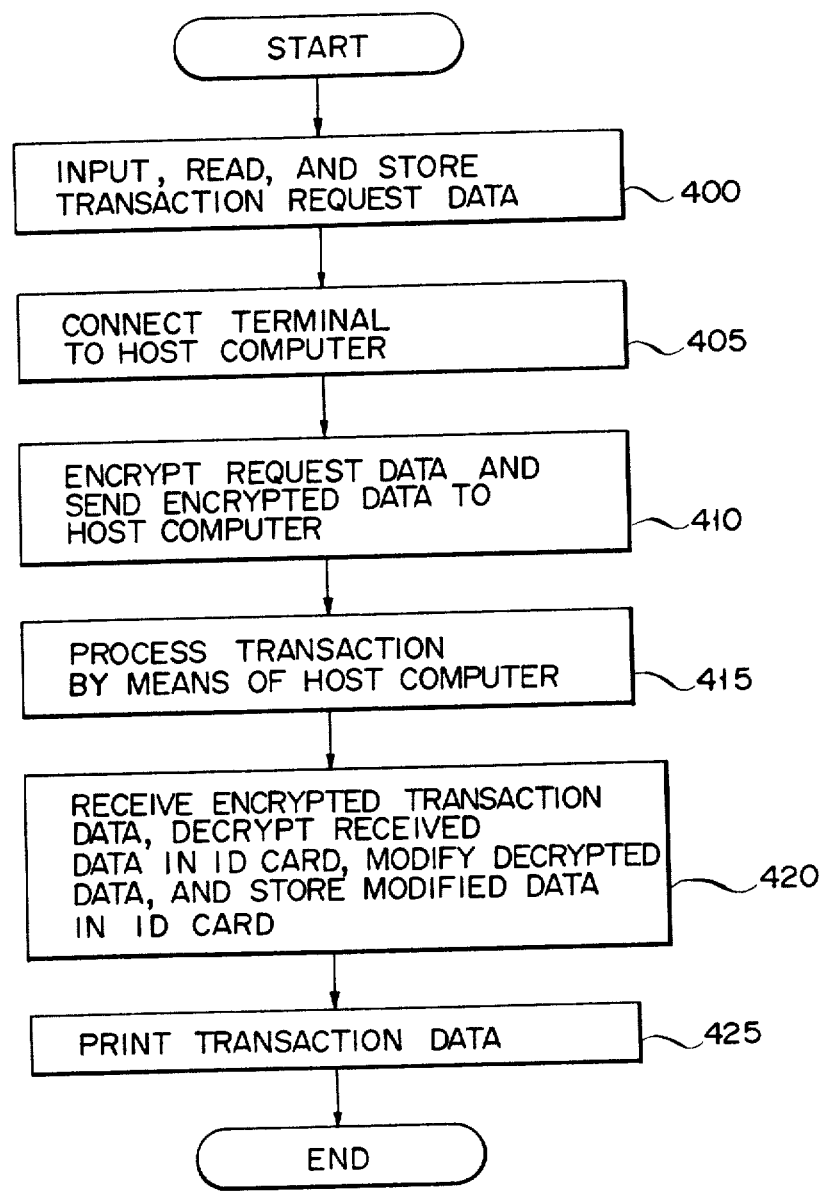
FIG. 11 is a flow chart for explaining data processing according to a fourth embodiment of the present invention.

FIG. 11 is a flow chart for explaining data processing according to a fourth embodiment. The fourth embodiment is substantially the same as the third embodiment, except that decryption of encrypted transaction data read out from the floppy disk 28 and conversion of the readout transaction data to modified transaction data are not performed in the terminal device but in the IC card, as shown in steps 420 and 425. The journal data alteration detection according to the fourth embodiment is the same as that of FIG. 10, and a description thereof will be omitted.

In the third and fourth embodiments, the encrypted transaction data read out from the floppy disk 28 is decrypted, and the decrypted transaction data is processed in accordance with the predetermined modification scheme, thereby obtaining the modified encrypted transaction data. However, the encrypted transaction data read out from the floppy disk 28 may be directly processed to obtain modified encrypted transaction data. In this case, in the journal check mode, the transaction data entered at the keyboard is encrypted and processed in accordance with the predetermined modification scheme, thereby obtaining the modified encrypted transaction data.

In all the embodiments described above, only one reference data for a comparison excluding the journal data is recorded, and journal data alteration is detected by a single comparison operation. However, a plurality of combinations of reference data may be recorded to check for any alterations of the journal data in accordance with a plurality of comparison operations as exemplified by a fifth embodiment.

Figure 12:
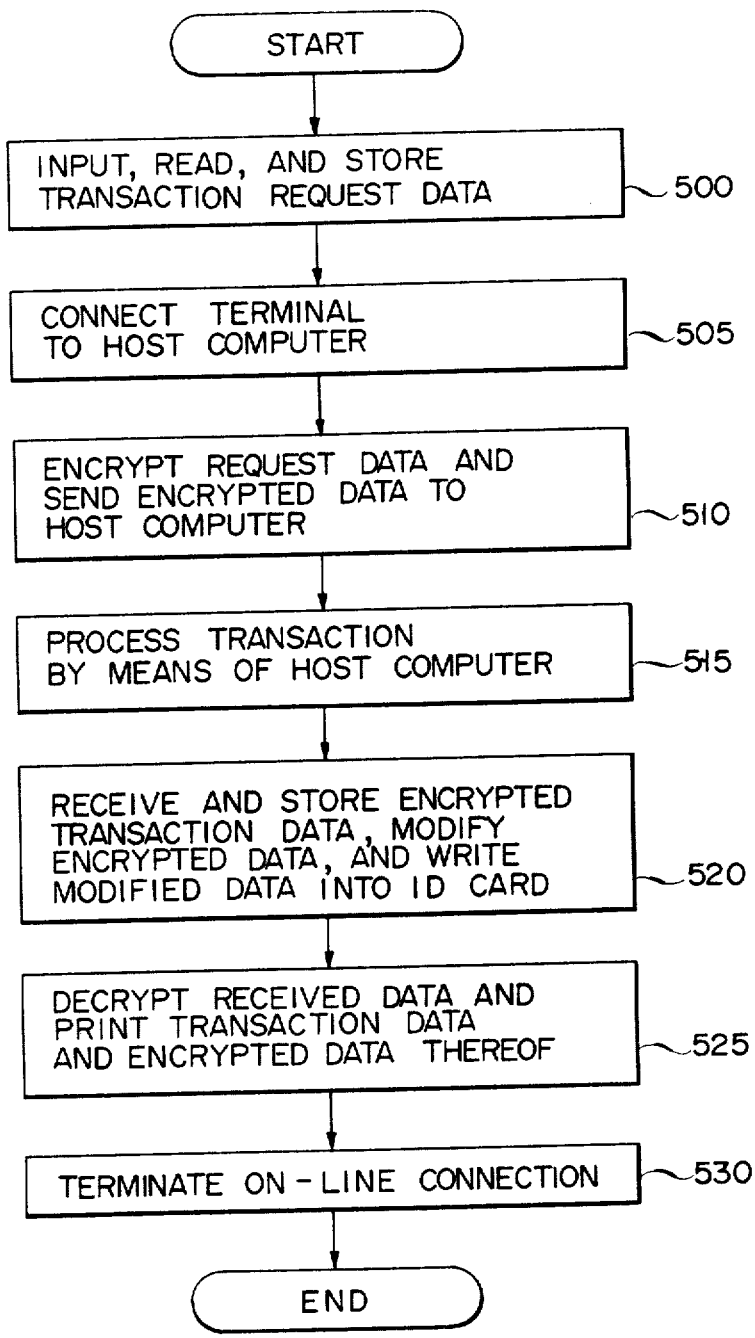
FIG. 12 is a flow chart for explaining data processing according to a fifth embodiment of the present invention.

FIG. 12 is a flow chart for explaining data processing according to the fifth embodiment. Steps 500 to 515 of the fifth embodiment are the same as steps 400 to 415 of the fourth embodiment, respectively. In step 520, the CPU 26 reads out the encrypted transaction data from the floppy disk 28. The readout data is processed in accordance with the predetermined modification scheme to obtain modified encrypted transaction data. The modified encrypted transaction data is written in the IC card 42. In step 525, the CPU 26 decrypts the encrypted transaction data read out from the floppy disk 28 and prints the decrypted transaction data and the transaction data together on the journal paper 30. Thereafter, in step 530, the on-line connection is terminated. In this manner, according to the fifth embodiment, the journal data is printed together with the encrypted data on the journal paper 30. At the same time, the modified data of the encrypted journal data is written in the IC card.

Figure 13:
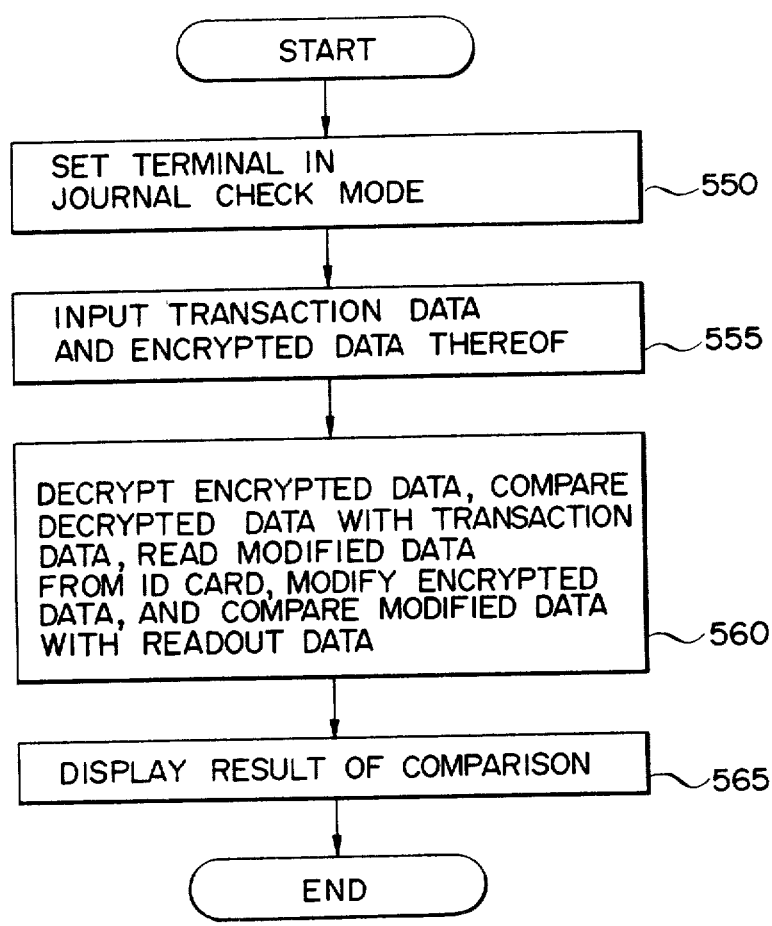
FIG. 13 is a flow chart for explaining journal data alteration detection according to the fifth embodiment of the present invention.

The journal check mode according to the fifth embodiment will be described with reference to a flow chart of FIG. 13. In step 550, the terminal device is set in the journal check mode. In step 555, the transaction data and its encrypted data which are printed on the journal paper 30 are entered. In step 560, the CPU 26 decrypts the encrypted transaction data in accordance with the same algorithm as in step 525. The CPU 26 compares the decrypted data with the input transaction data. At the same time, the CPU 26 reads out the modified encrypted transaction data from the IC card 42 inserted in the ID card reader/writer 40 and converts the key input encrypted transaction data to modified encrypted transaction data in the same modification scheme as in step 520. The CPU 26 then compares these two modified transaction data. When a noncoincidence is detected by the CPU 26, the CPU 26 detects that the transaction data and/or its encrypted data which is written on the journal paper 30 is altered. When a coincidence is detected by the CPU 26, the CPU 26 detects that the transaction data and its encrypted data have not been altered. According to the fifth embodiment, double checking is performed to improve detection precision of data alteration.

According to the present invention, as described in detail, the modified journal data which is processed in accordance with a manner unknown to the user is recorded together with the normal journal data. When the journal data is compared with the corresponding modified data, journal data alteration can be easily detected.

The present invention is not limited to the particular embodiments described above. Various changes and modifications can be made within the spirit and scope of the invention.

What is claimed is:

1. A data processing terminal device, adapted to be on-line connected to a host computer so that input data are sent to the host computer, the input data being processed by the host computer, and encrypted by an encrypting algorithm which is unknown to a user of the terminal device to produce encrypted journal data, and is returned to the terminal device, comprising:

means for receiving the encrypted journal data from the host computer;

means for decrypting the received encrypted journal data using a decrypting algorithm unknown to the user of the terminal device;

first recording means for recording the received encrypted journal data along with decrypted journal data on a first recording medium; and second recording means for recording the encrypting algorithm on a second recording medium.

2. The device according to claim 1, wherein said first recording medium includes a single paper sheet, said first recording means prints said received encrypted journal data and said decrypted journal data on the single paper sheet, and wherein said second recording means includes an IC card with a memory, the encrypting algorithm being stored in said memory of said IC card.

3. The device according to claim 1, wherein the terminal device is a banking terminal device which encrypts transaction request data and sends the encrypted transaction request data to the host compter, and in which the host computer encrypts the transaction data and sends the encrypted transaction data to the terminal device.

4. The device according to claim 1, which further comprises:

means for inputting said received encrypted journal data and the decrypted journal data recorded on the first recording medium;

second decrypting means for decrypting the encoded data input by said inputting means using said encrypting algorithm recorded in the second recording means; and means for determining whether said input decrypted data and the data decrypted by said second decrypting means coincide with each other, thereby detecting an alteration of the encoded data and decoded data recorded on the first recording medium.

5. The device according to claim 1, wherein said first recording medium which stores the encrypted data and decrypted data is a floppy disk memory, and said second recording medium which stores said encrypting algorithm is memory of an IC card.

6. The device according to claim 1, in which said encrypting algorithm can be changed at intervals of at least one process of the host computer.

7. A method of processing in a data processing terminal device which is adapted to be on-line and connected to a host computer, comprising the steps of:

receiving encrypted journal data from the host computer;

decrypting the received journal data using a decrypting algorithm which is unknown to a user of the terminal device;

recording the received encrypted journal data along with the decrypted journal data on a first recording medium; and recording the encrypting algorithm on a second recording medium.

8. A method as in claim 7 comprising the further step of changing the encryption key at predetermined intervals.

* * * * *